(12) United States Patent
Yamaga (10) Patent No.: US 7,050,790 B2
(45) Date of Patent: May 23, 2006

(54) INFORMATION RETRIEVAL SYSTEM (75) Inventor: Yoko Yamaga, Yokosuka (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 557 days.

(21) Appl. No.: 09/915,551

(22) Filed: Jul. 27, 2001

(65) Prior Publication Data
US 2002/0013818 A1 Jan. 31, 2002

(30) Foreign Application Priority Data
Jul. 27, 2000 (JP) ............................. 2000-226773
Jun. 14, 2001 (JP) ............................. 2001-179815

(51) Int. Cl.
*H04M 11/10* (2006.01)
(52) U.S. Cl. ................ 455/412.1; 455/502; 455/414.1; 455/414.2; 455/41.2
(58) Field of Classification Search ............. 455/412.1, 455/412.2, 414.1, 414.2, 414.3, 414.4, 41.2, 455/41.3, 502, 403, 503, 517, 560
See application file for complete search history.

(56) References Cited
U.S. PATENT DOCUMENTS
6,549,773 B1 *  4/2003  Linden et al. ........... 455/426.1
6,615,186 B1 *  9/2003  Kolls ........................ 455/12.1
6,697,632 B1 *  2/2004  Sood ........................... 455/502
2002/0065066 A1 *  5/2002  Takagaki ..................... 455/412

FOREIGN PATENT DOCUMENTS
JP  08-154074  6/1996
JP  11-065494  3/1999

* cited by examiner

*Primary Examiner*—Joseph Feild
*Assistant Examiner*—Huy D. Nguyen
(74) *Attorney, Agent, or Firm*—Jacobson Holman PLLC (57) ABSTRACT A server transmits audio and/or visual information in a limited space. A hand-held device communicates with the server by two-way communication while the hand-held device is located in the space that is a communications area covered by the server. The server transmits relevant information on the audio and/or visual information to the hand-held device on request made by the hand-held device. An information providing apparatus may transmit audio and/or visual information in the space. A server communicates with the information providing apparatus by two-way communication to provide the relevant information on request made by the information providing apparatus. The relevant information provided to the information providing apparatus is output in the space in synchronism with the audio and/or visual information.

7 Claims, 7 Drawing Sheets

INFORMATION RETRIEVAL SYSTEM

BACKGROUND OF THE INVENTION

The present invention relates to an information retrieval system through which users can retrieve relevant information that is related to audio/visual information while audio/visual information such as music and movies are distributed to the users within a limited communications area.

Shops that sell package media such as CDs and DVDs play promotional audio/visual information via speakers and monitors in the shops. Not only that, these shops play music and video themselves via speakers and monitors within such small spaces so as not make people (users) tired in the shops.

Users can watch or listen to such promotional audio/visual information in many places in addition to those shops.

Users may take interest in those promotional audio/visual information while watching or listening and want know relevant information (for example, titles and artists for music or titles and actors for movies). They, however, can rarely get such relevant information in CD shops through posters or sales clerks.

Users may get such relevant information via a general information retrieval system as follows:

They can get those information through posters displayed or monitors set near speakers via which they listen to audio information such as music, posters displayed near monitors via which they watch visual information such as movies or telops running on such monitors.

Users can ask audio/visual information providers about those relevant information if they know the providers. Moreover, such information may be retrieved via hand-held device (user's device) or terminal set in CD shops using keywords for titles of audio/visual information or for makers or composers of those information.

It is, however, a heavy burden for managers who manage CD shops or other in which audio/visual information are played, to update relevant information while providing relevant information through posters displayed or monitors set near speakers via which they listen to audio information such as music, posters displayed near monitors via which they watch visual information such as movies or telops running on such monitors.

Moreover, if there is no information peculiar to audio/visual information and usable as keywords, relevant information cannot be retrieved via hand-held device or terminal set in CD shops.

Japanese Un-Examined Patent Publication No. 8-154074 discloses a communications system in combination of FM-broadcasting and public telephone network.

This system requires frequency allocation to several shops, that want to distribute information via this system, when they are located closely, which further forces users to check the frequency for each shop or adjust frequencies for their hand-held devices.

Use of broadcasting as a means of information distribution in an area in which several shops are located closely, as explained above, is not usable and causes several problems.

Moreover, information could be lost once retrieved if users do not have any means of recording the information or a telephone number for the shops.

Japanese Un-Examined Patent Publication No. 11-65494 discloses an information distribution system in which users visit particular sites and get information via their own hand-held devices.

In this system, when users take an interest in hanging posters or sign boards at shops or other sites, they can get information from devices for providing information attached on the hanging posters or sign boards to their hand-held devices by wireless communications.

However, users have to get detailed information at shops or other sites, so that it takes long or they need a large capacity for the memories of their hand-held device. Or, they have to receive unnecessary information.

In these systems, it is hard for users to have access to relevant information on audio/visual information or to know how to buy goods related to the audio/visual information when they watch or listen to the information.

SUMMARY OF THE INVENTION

A purpose of the present invention is to provide an information retrieval system by which users can access relevant information on audio/visual information in synchronism with the information while they are watching or listening to the information.

The present invention provides an information retrieval system comprising: a server to transmit audio and/or visual information in a limited space; and a hand-held device capable of two-way communication with the server while the hand-held device is located in the limited space that is a communications area covered by the server, the server transmitting relevant information on the audio and/or visual information to the hand-held device in response to a request made by the hand-held device.

Moreover, the present invention provides an information retrieval system comprising: an information providing apparatus to transmit audio and/or visual information in a limited space; and an information providing server capable of two-way communication with the information providing apparatus, to provide the information providing apparatus with relevant information on the audio and/or visual information in response to at least a request made by the information providing apparatus, the relevant information provided to the information providing apparatus from the server being output in the limited space in synchronism with the audio and/or visual information.

DETAILED DESCRIPTION OF PREFERRED EMBODIMENTS

Preferred embodiments according to the present invention will be disclosed with reference to the attached drawings.

First Embodiment

Figure 1:
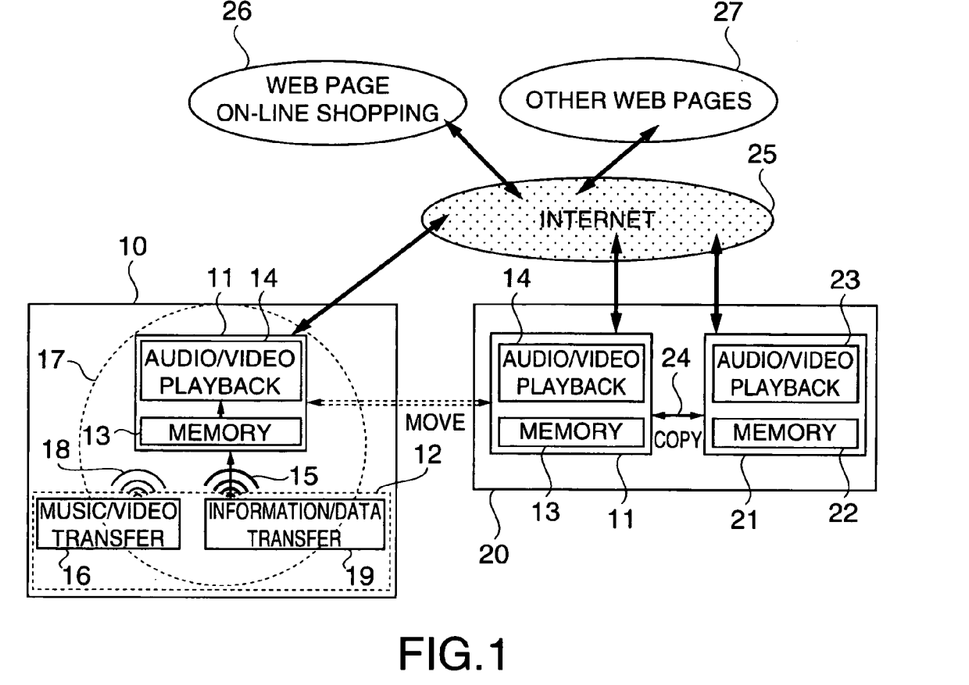
FIG. 1 shows a block diagram of a first preferred embodiment of an information retrieval system according to the present invention.

FIG. 1 shows a block diagram of a first preferred embodiment of an information retrieval system according to the present invention.

The information retrieval system includes a hand-held device (a user device) 11 having a function of data communications and a server 12 also having a data communications function.

The server 12 is equipped with a wireless communications interface 15 such as Bluetooth (trademark) for communications with the hand-held device 11.

The hand-held device 11 is also equipped with the same wireless communications interface 15.

The server 12 is set in a limited space 10 such as a shop and has a music/video-transferring function 16 via speakers or monitors (not shown). Instead of the server 12, such function 16 can be installed in a hardware (not shown) capable of communication with the server 12.

The music/video-transferring function 16 shows/plays audio/visual information 18 such as movies and music in the space 10.

In synchronism with the audio/visual information 18, the server 12 transmits relevant information and URL (Uniform Resource Locator, also called relevant information) related to the information 18 to the space 10 using its information/data-transferring function 19 via the wireless communications interface 15.

The relevant information can be transmitted to the hand-held device 11 when a user who carries the device 11 enters a communications area 17 covered by the server 12.

The two-way communication between the server 12 and the hand-held device 11 via the communications interfaces 15 within the communications area 17 of the space 10 is called the first communications network hereinafter.

The hand-held device 11 recognizes that it is now located in the communications area 17 in the space 10 and establishes the communications with the server 12 over the first communications network when the user carrying the device 11 takes an interest in the relevant information on the audio/visual information 18 while watching or listening to the information in the communications area 17.

On the establishment of communications, the server 12 transmits the relevant information and/or URL on the audio/visual information 18 to the hand-held device 11 in synchronism with the information 18 that is shown/played in the space 10.

The amount of data to be transmitted to the hand-held device 11 is as small as possible in accordance with an access time. The server can transmit a part of the audio/visual information 18 or a part of the compressed information 18 to the device 11.

The hand-held device 11 terminates the communications with the server 12 when the retrieval of information is completed. The communications also terminates when the hand-held device 11 is carried to the outside of the communications area 17 even if the communications is not completed. The data transfer can, however, be held when the hand-held device 11 is carried to the outside of the communications area 17 and resumed after the communications is established again.

Or, the communications may forcefully be terminated when the hand-held device 11 is carried to the outside of the communications area 17 and started again from the beginning when the user again enters into the area 17.

Moreover, the hand-held device 11 may go off a warning sound when the user gets out of the communications area 17.

Figure 2:
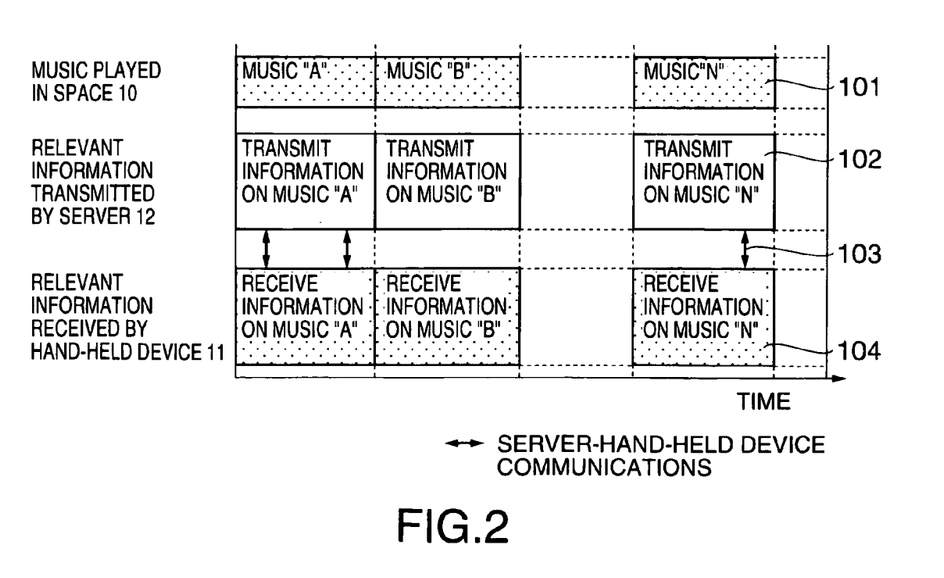
FIG. 2 illustrates the relationship between audio/visual information and relevant information in an information retrieval system according to the present invention.

As illustrated in FIG. 2, while the music/video-transferring function 16 is transmitting a song N (101) from among music "A", "B", . . . , and "N", the sever 12 keeps on standby for transmission (102) of the music "N"-relevant information on the song N101.

During the standby mode, the hand-held device 11 can receive (104) the song "N"-relevant information after it has established the communications (103) with the server 12 in the communications area 17.

The retrieved relevant information is displayed on a screen of the hand-held device 11 for real-time viewing. The retrieved relevant information, URL and/or data on the audio/visual information 18 can be stored in a memory 13 of the device 11 so that the user can access the relevant information even though he or she is outside the communications area 17 of the space 10.

The hand-held device 11 may be equipped with audio/video playback function 14 for playback of the data on the audio/visual information 18.

The user can have access to a Web page 26 indicated by the relevant information (UTR) over a network such as the Internet 25 via the hand-held device 11 for more detailed information on the audio/visual information 18.

This wide-area communications over the network is called the second communications network hereinafter.

The user can download the audio/visual information 18 or other data related to the information 18 to the hand-held device 11 from the server 12 or the Web page 26 indicated by the relevant information (URL) over the network.

If the user wants goods such as a CD and a DVD on which the audio/visual information 18 has been stored or other related goods that can not be retrieved as electronic data, they can be ordered through on-line shopping on the Web page 26.

The user may establish the communications with the server 12 again for those goods other than electronic data when the server 12 has an on-line-shopping function.

When the space 10 is for example a CD shop that has a stock of CDs, DVDs and so on, the user transmits the data to the CD shop and get the goods there. Or, the user may tell a clerk on the data if the clerk is in the space 10. The user may get the goods at home by delivery service or at convenience stores, etc., located at several places.

The user can retrieve the relevant information anytime via the hand-held device 11 after he or she moves with the device 11 to another space 20 such as a home.

Moreover, at the space 20, the user can have access to a Web page indicated by the relevant information (URL) over the second communications network for retrieving more detailed information on the audio/visual information 18, downloading data on the information 18 for free (or charged later) or ordering goods through on-line shopping.

As disclosed, the user can retrieve the relevant information on the audio/visual information 18 or the information 18 itself via the hand-held device 11.

Not only that, the user can transfer or copy (24) the necessary data to another hand-held device 21 set at home via the Internet, cable communications or wireless communications. The device 21 also has a memory 22 and an audio/video playback function 23. Data transfer or copy may be restricted under the copyright law.

Once the data has been transferred or copied to the device 21, the user can have access to a Web page indicated by the relevant information (URL) over the second communications network via the device 21 for retrieving more detailed information on the audio/visual information 18, downloading data on the information 18 or ordering goods through on-line shopping.

Figure 3:
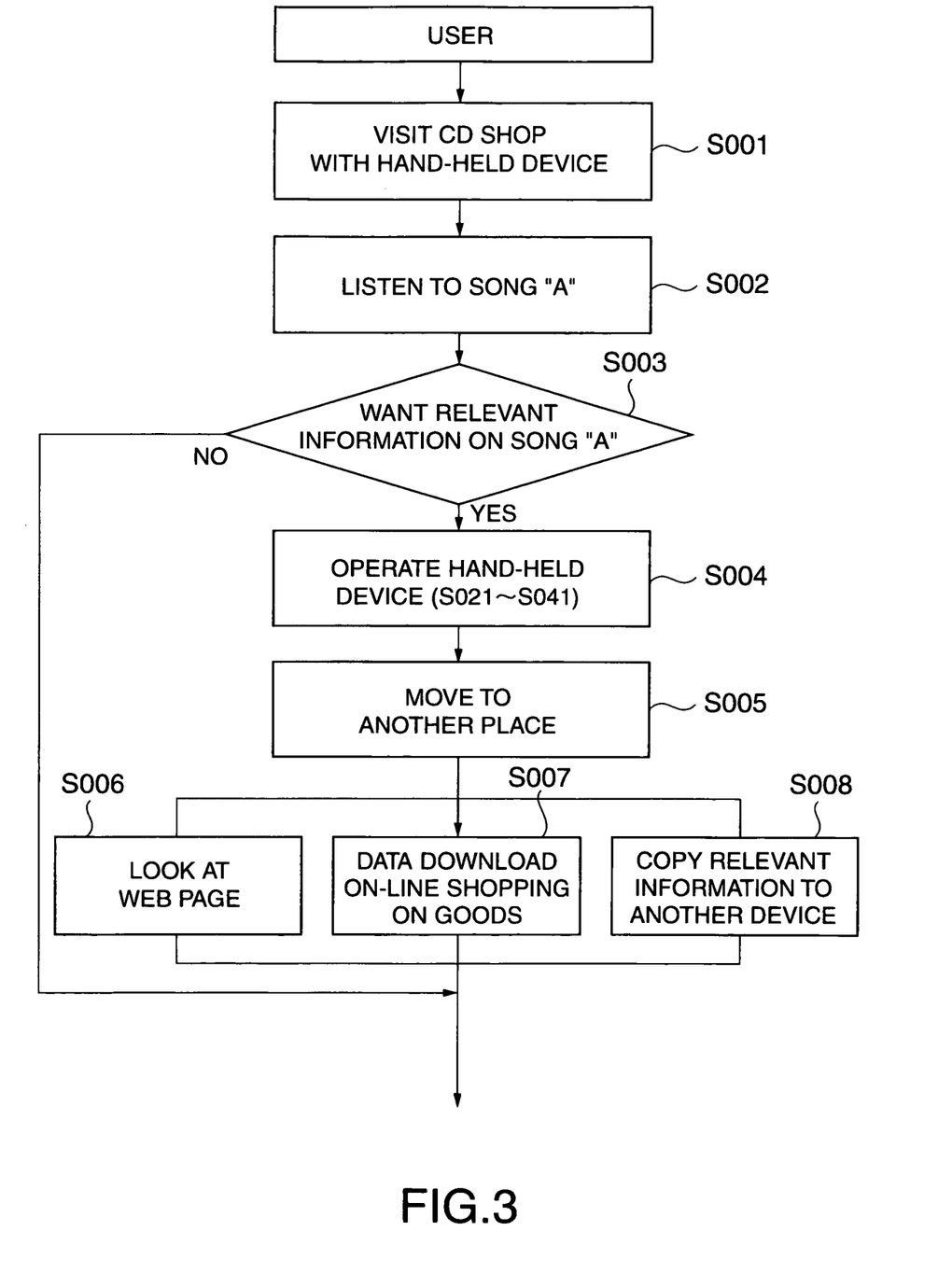
FIG. 3 shows a flow chart for explaining actions of a user in an information retrieval system according to the present invention.
Figure 4:
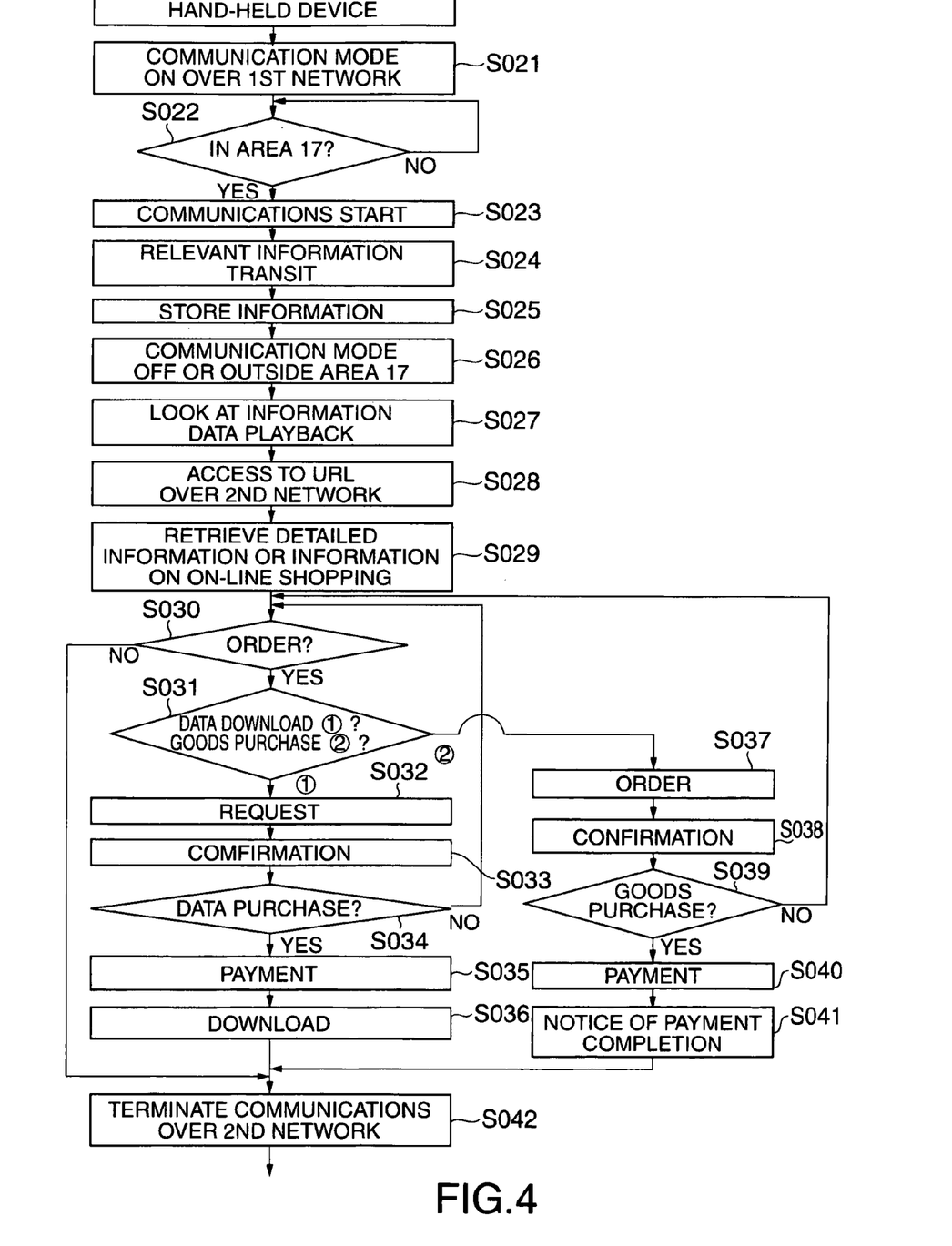
FIG. 4 shows a flow chart for explaining operations of a hand-held device in an information retrieval system according to the present invention.

Disclosed next with reference to FIGS. 3 and 4 is a process of retrieving relevant information on music played via a speaker at a shop such as a CD shop and ordering goods using the hand-held device 11.

The server 12 is set in a CD shop, having wireless communications means (the first communications network), such as Bluetooth, for local wireless communications within the communications area 17 in the space 10.

The hand-held device 11 can communicate with the server 12 over the first communications network.

The CD shop has a system for playing music there. The server 12 has an information/data-transferring function 19 so that it can transmit music-relevant information on music played in the CD shop to the hand-held device 11 over the first communications network in synchronism with the music played in the CD shop.

In FIGS. 3 and 4, a user carrying the hand-held device 11 visits the CD shop while playing a song "A" (step S001) and listens to the song "A" via a speaker (step S002).

When the user wants relevant information on the song "A" (YES in step S003), he or she sets the hand-held device 11 in a communications mode while the song "A" is played in the CD shop (step S004 in FIG. 3, step S021 in FIG. 4) and enters into the communications area 17 covered by the server 12 (step S022).

The user establishes and starts communications between the hand-held device 11 and the server 12 (step S023) via wireless communications interface. The frequency for the communications is automatically set between the hand-held device 11 and the server 12 via Bluetooth as a wireless communications means so that the user requires no frequency adjustments.

Once the communications between the hand-held device 11 and the server 12 has been established, the server 12 transmits the relevant information to the device 11 over the first communications network (step S024).

The user retrieves the relevant information at the hand-held device 11 and stores it in the memory 13 (step S025).

The hand-held device 11 terminates the communication mode on completion of data retrieval from the server 12 (step S026).

The server 12 can transmit special information only for users who enters the communications area 17, such as, sales and event information or issuing user IDs in addition to general information on the song "A", for attracting customers to the CD shop.

Once a part of a digitized song "A" (called data "A" hereinafter) or compressed data "A" has been received by the hand-held device 11, it can be played back when the device 11 has such a function (step S027).

The data retrieved via the hand-held device 11 has a required minimum amount so that the user does not need to retrieve unnecessary data.

The user can have access to a Web page indicated by the relevant information (URL) retrieved to the hand-held device 11 for further detailed information on the song "A" over the second communication network, such as the Internet.

When the user wants to buy a CD, goods or data for the song "A", he or she has access to a Web page indicated by the relevant information URL (step S028), to retrieve further detailed information on the song "A" or information on on-line shopping (step S029).

If not ordering the data "A" or the related goods through on-line shopping (NO in step S030), the communications over the second communications network is terminated after accessing the information (step S042).

On the other hand, if ordering the data "A" or the related goods through on-line shopping (YES in step S030), the user selects data "A"-downloading or purchase of a CD, etc (step S031).

When downloading the data "A" (① in step S031), the user requests data "A"-downloading on the Web page (step S032). In response to the request, request-confirming information such as the title of the data "A", the name of the artist and the price, etc., are displayed on the Web page (step S033).

If the user decides to buy the data "A", he or she accepts the confirmation (YES in step S034), takes a payment procedure (step S035) and downloads a part of or all of the data "A" or the compressed data "A" to the hand-held device 11 (step S036).

When data "A"-downloading from the server 12 is possible, the user establishes the communications between the hand-held device 11 and the server 12 over the first communications network in the communications area 17 and requests the server 12 for downloading the data "A".

The same as downloading from the Web page, the user takes a payment procedure and receives the data "A" from the server 12 to the hand-held device 11.

Moreover, when the user wants to buy a package medium such as a CD that has stored the song "A" (② in step S031), he or she orders the package medium through on-line shopping on a Web page indicated by the relevant information URL (step S037).

When information on price, stocks, etc., is displayed on the Web page (step S038), and if the user decides to buy (YES in step S039), he or she accepts the order confirmation and takes a payment procedure (step S040). On receiving the notification of payment-procedure completion (step S041), the user terminates the communications over the second communications network (step S042).

After moving to another place from the CD shop or going home (step S005 in FIG. 3), the user can have access to the Web page indicated by the relevant information URL for retrieving detailed information on the song "A" (step S006).

Moreover, the user can have access to another Web page 27 (FIG. 1) linked to that Web page 26 for more information in addition to the relevant information on the song "A", data "A"-downloading or on-line shopping on goods related to the song "A" (step S007).

The relevant information retrieved from the server 12 as disclosed can be copied to the other hand-held device 21 set at user's home (step S008). Then, the user can have access to the stored relevant information and to a Web page indicated by the stored URL for ordering the data "A" or related goods via the device 21.

Second Embodiment

Figure 5:
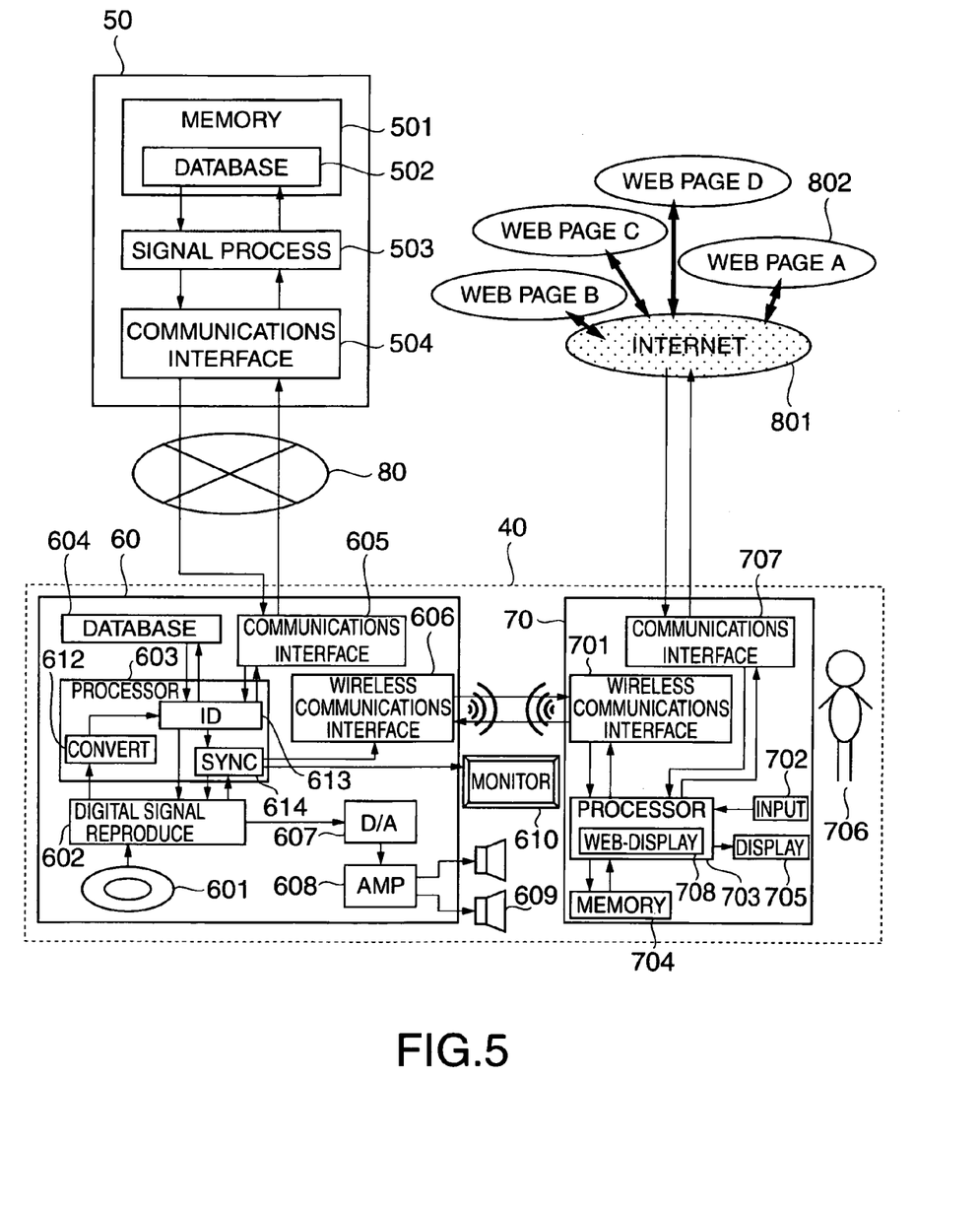
FIG. 5 shows a block diagram of a second preferred embodiment of an information retrieval system according to the present invention.
Figure 6:
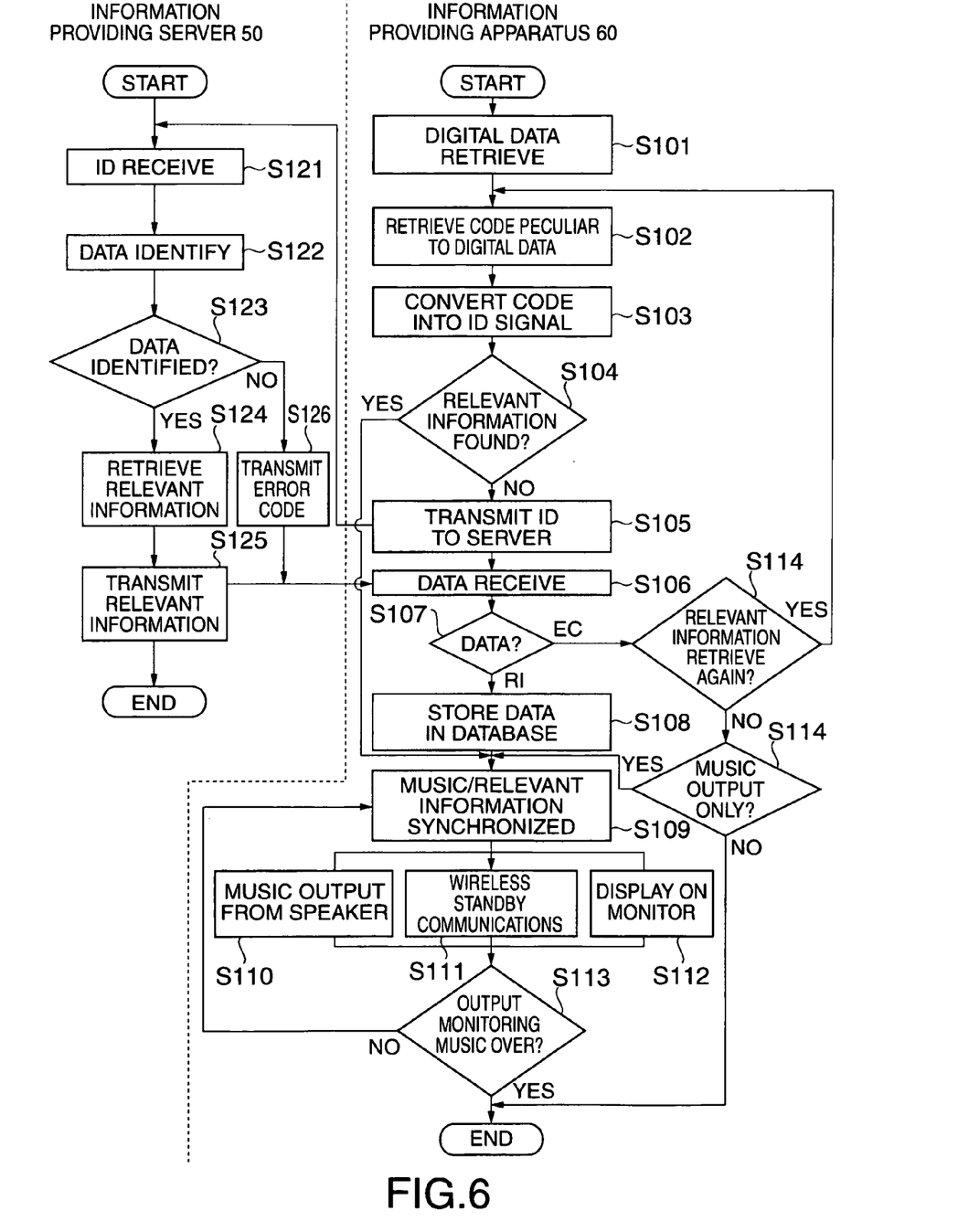
FIG. 6 shows flow charts for explaining operations of an information providing apparatus and an information providing server in the second embodiment of an information retrieval system according to the present invention.

Disclosed next with reference to FIGS. 5 and 6 is a second preferred embodiment of an information retrieval system according to the present invention.

An information providing apparatus 60 set in a space 40 such as a shop has a digital-signal reproducer 602 for reproducing digital signals for music stored on media such as CDs.

A storage medium 601 such as a CD that has stored music information is set on the digital-signal reproducer 602 for digital-data retrieval (step S101).

The digital-signal reproducer 602 retrieves codes peculiar to digital data stored on the storage medium 601 (step S102). The retrieved codes are converted into an identification (ID) signal by a signal converter 612 (step S103) and sent to an identifying (ID) section 613.

The identifying section 613 has access to a database 604 of relatively small storage capacity and, if no information relevant to the digital data stored in the storage medium 601 is found in the database 604 (NO in step S104), it transmits the identification signal to an information providing server 50 via communications interfaces 605 and 504 over a network 80 (step S105).

When the identification signal is received by the communications interface 504 (step S121), it is input to a signal processor 503 for determining what is the digital data stored in the storage medium 601 based on the identification signal.

When the digital data is identified (YES in step S123), relevant information related to the digital data is retrieved from a database 502 of large storage capacity in a storage device 501 (step S124).

The retrieved relevant information is transmitted to the information providing apparatus 60 via the communications interfaces 504 and 605 over the network 80 (step S125).

If the digital data is not identified or no relevant information is found in the database 502 (NO in step S123), an error code is transmitted to the information providing apparatus 60 (step S126).

On reception of data from the information providing server 50 (step S106), the information providing apparatus 60 inputs the data into the identifying section 613.

If the data is identified as the relevant information (RI in step S107), it is stored in the database 604 (step S108). However, if the relevant information has been stored in the database 604 (YES in step S104), the information providing apparatus 60 retrieves the relevant information stored in the database 64 instead of accessing the information providing server 50.

Disclosed next is output of relevant information.

The signal retrieved from the storage medium 601 by the digital-signal reproducer 603 is sent not only to the signal processor 603 but also to a digital-to-analog (D/A) converter 607. An analog-converted signal is amplified by an amplifier 608 and output via an audio output section 609 such as speakers.

As disclosed, while a song is played in the space 40 such as a shop, the relevant information can be distributed to users. The song and relevant information are controlled by a synchronizer (SYNC) 614 so that they are output as synchronized with each other (step S109).

In synchronism with sound output in the space 40 via the an audio output section 609 such as speakers (step S110), the relevant information received from the information providing server 50 or stored in the database 604 and a wireless communications interface 606 are set in a standby mode so that it can be transmitted to a hand-held device (a user device) 70 located in the space 40 whenever a relevant information access signal is sent from the hand-held device 70 to the communications interface 606 (step S111).

The relevant information can further be displayed on a video output section 610 such as a monitor (step S112).

These audio and video outputs are monitored by the synchronizer 614.

The synchronizer 614 continues output monitoring and the wireless communications interface 606 is in the standby mode while a song is played (NO in step S113).

Once the song is over (YES in step S113), the wireless communications interface 606 is released from the standby mode and displaying of the relevant information is terminated.

Figure 7:
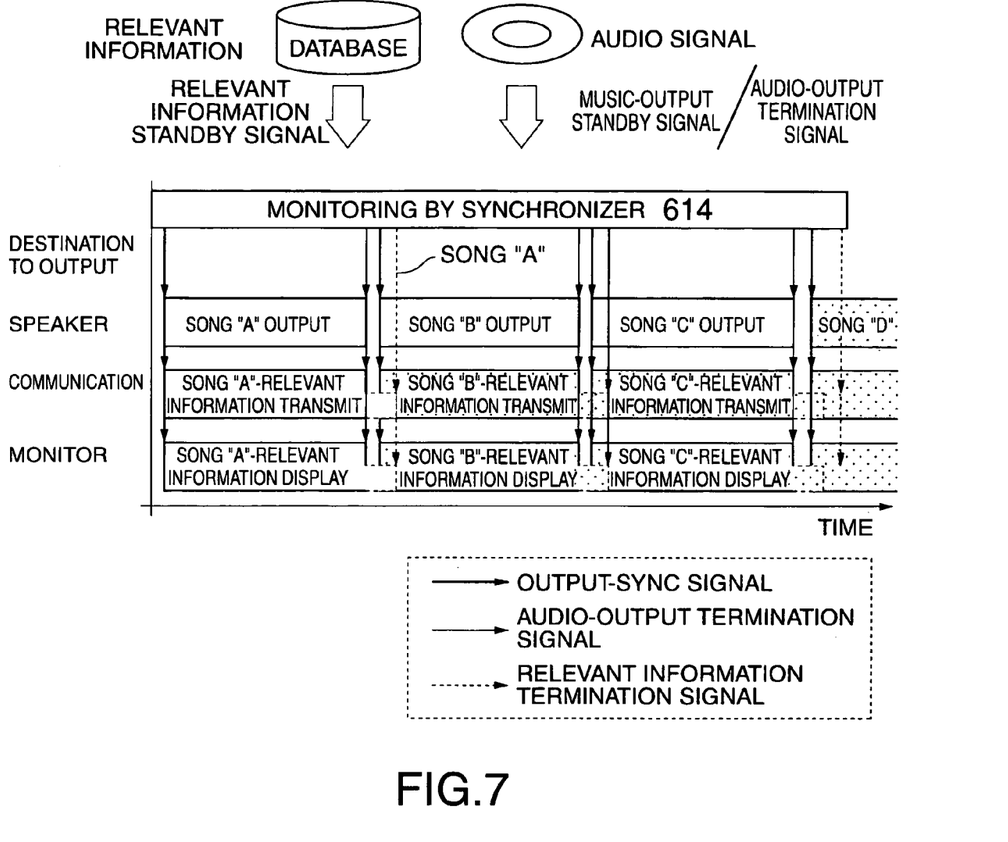
FIG. 7 illustrates timing chart for each output in the second embodiment of an information retrieval system according to the present invention.

Disclosed next with reference to FIG. 7 is synchronization of audio and video outputs and the relevant information.

In the information retrieval system shown in FIG. 5, the digital signal reproducer 602 sends a music-output standby signal to the synchronizer 614 once digital data of song "A" is retrieved from the storage medium 601 to the digital signal reproducer 602 and ready for playback.

The identifying section 613 sends a relevant information standby signal to the synchronizer 614 when data output for the relevant information on the song "A" is ready.

When both the song "A" and the relevant information are ready for output, the synchronizer 614 sends an output-synchronizing signal to the digital signal reproducer 602.

On reception of the output-synchronizing signal, the digital signal reproducer 602 outputs the digital data of the song "A" via the audio output section 609 such as speakers.

Simultaneously with this, when the relevant information-request signal is transmitted to the wireless communications interface 606 from the hand-held device 70, the interface 606 sets the relevant information on the song "A" in a standby state so that it can be transmitted to the hand-held device 70 anytime.

The relevant information on the song "A" can be displayed on the video output section 610 such as a monitor screen when it is set the output side of the information providing apparatus 60. The relevant information output is monitored by the synchronizer 614.

The synchronizer 614 also monitors the audio output even when a CD, for example, is used as the storage medium 601, on which a playing time has been recorded so that it is known when the song will be over, it may be stopped in the middle of playing.

When the audio output is terminated because the song "A" is over or it is stopped in the middle of playing, the digital signal reproducer 602 sends an audio-output termination signal to the synchronizer 614.

On reception of the audio-output termination signal, the synchronizer 614 releases the wireless communications interface 606 from the standby mode for transmission of the relevant information on the song "A" to the hand-held device 70 and terminates displaying of the relevant information on the video output section 610.

An audio-output standby signal and also a relevant information-output standby signal both for a song "B" are sent to the synchronizer 614. The song "B" and the relevant information are output like the song "A".

After completion of audio output for the song "A", a standby state for the relevant information on the song "A" to be displayed on a monitor or transmitted to the hand-held device 70 can be continued even if audio output for the song "B" begins.

Figure 8:
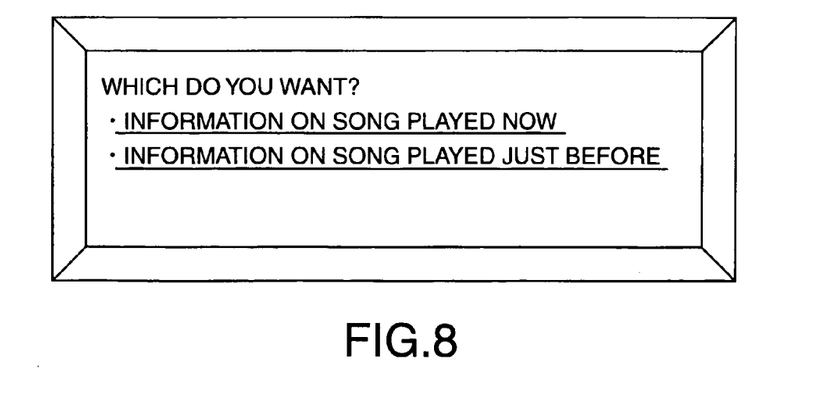
FIG. 8 illustrates selection of relevant information displayed on monitor during music-data switching in the second embodiment of an information retrieval system according to the present invention.

As indicated in FIG. 8, a user selects the relevant information on either the song "A" or "B", which corresponds to dot arrows (relevant information termination signal) for the song "A"-relevant information communications and the song "A"-relevant information displaying illustrated in FIG. 7.

On elapse of a predetermined time, a relevant information-termination signal for the song "A" is sent to the synchronizer 614 to terminate the communications-standby state and monitoring for the relevant information for the song "A". The process is repeated for songs "C", "D", . . .

On the other hand, if signal sent from the information providing server 50 (step S105) is an error code (EC instep S107) in FIG. 6, and if the information providing apparatus 60 wants to try again retrieval of the relevant information (YES in step S114), the process returns to step S102 in which the digital-signal reproducer 602 retrieves information from the medium 601 other than the peculiar code already retrieved.

The information is identification information for digital data stored in the storage medium 601 and composed based on the number of songs, a recording time for each song, the total recording time and an audio signal for the songs stored on the storage medium 601.

This identification information is provided for CDs on which no data peculiar to digital data has been recorded.

The retrieved identification information is transmitted again to the information providing server 50. If no digital data is identified by the identification information or no relevant information is found, the server 50 transmits again an error code to the information providing apparatus 60.

On receiving the error code, the information providing apparatus 60 retrieves further another information from the storage medium 601 to identify the digital data.

The steps S102 to S107 are repeated until the digital data is identified.

If the information providing apparatus 60 does not want relevant information any more (NO in step S114) but wants music output only (YES in step S115), information providing apparatus 60 outputs the music into the space 40 like when relevant information is required and is set in a standby state for transmitting a notice that no relevant information is found. In response to a user relevant-information request, the video output section 610 such as a monitor displays the notification "NO RELEVANT INFORMATION FOUND".

The process ends if the information providing apparatus 60 does not want the music itself (NO in step S115).

Figure 9:
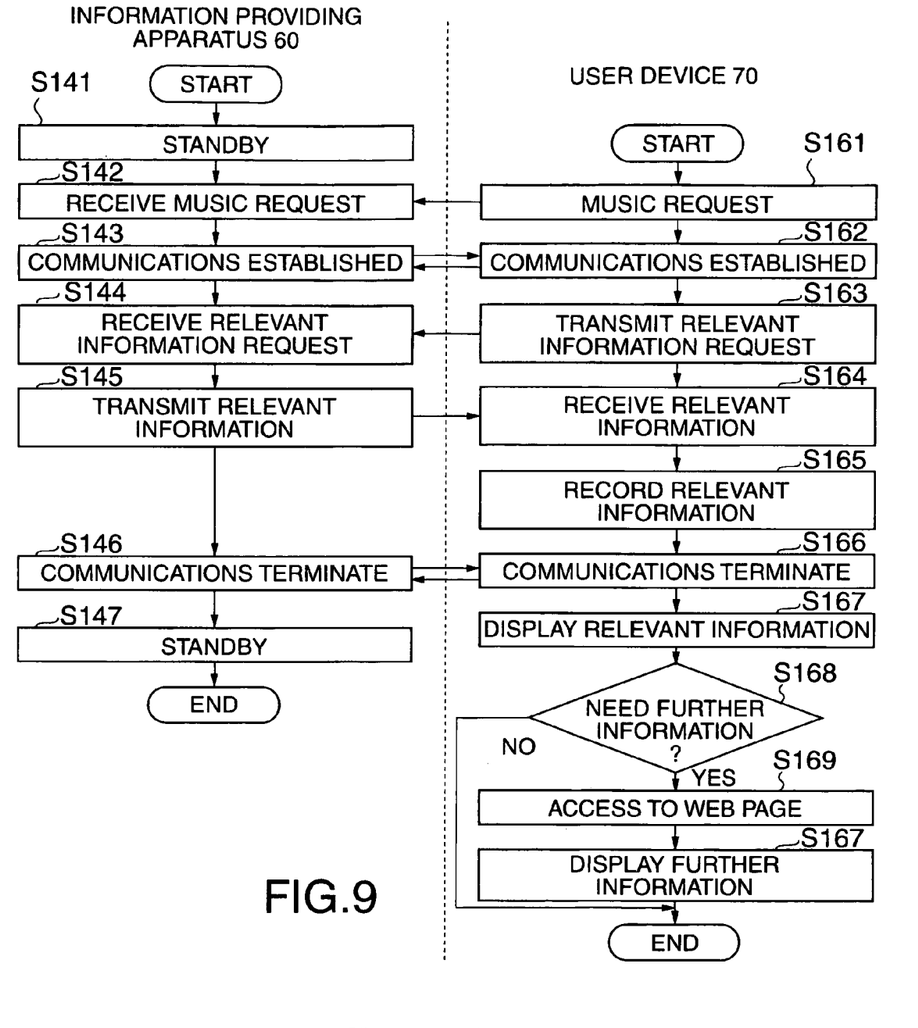
FIG. 9 shows flow charts for explaining operations of an information providing apparatus and a hand-held device in the second embodiment of an information retrieval system according to the present invention.

Disclosed next with reference to FIG. 9 is an operation of the hand-held device 70.

A user 706 (FIG. 5) enters into the space 40 with the hand-held device 70 that is capable of communicating with the information providing apparatus 60 under Bluetooth, etc.

While listening to music played in the space 40 via the audio output section 609 such as speakers, and when the user 706 wants to know relevant information on the music, he or she transmits a communication request signal from an input section 702 of the hand-held device 70 via a wireless communications interface 701 (step S161) to the information providing apparatus 60 which has been in a standby state for receiving the communication request signal (step S141).

The information providing apparatus 60 receives the music request signal via the wireless communications interface 606 (step S142) and establishes communications with the hand-held device 70 (steps S143 and S162).

The user 706 transmits a relevant-information request signal from the hand-held device 70 to the information providing apparatus 60 (step S163).

On receiving the relevant-information request signal (step S144), the information providing apparatus 60 retrieves relevant information from the database 604 that has stored the relevant information provided by the information providing server 50 and transmits the relevant information to the hand-held device 70 via the wireless communications interface 606 (step S145).

The hand-held device 70 receives the relevant information via the wireless communications interface 701 (step S164) and records the information to a memory 704 via a signal processor 703 (step S165).

The hand-held device 70 may be equipped with a dedicated button on the input section 702 only for transmitting a relevant-information request signal for easy access to the relevant-information.

The information providing apparatus 60 and the hand-held device 70 terminate the communications (steps S146, S166). The apparatus 60 is set in a standby mode for receiving user signals.

Figure 10:
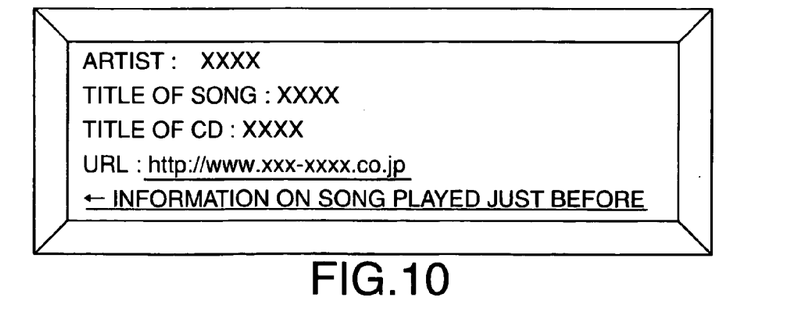
FIG. 10 illustrates relevant information displayed on monitor in an information retrieval system according to the present invention.

The relevant-information as retrieved may be displayed on a display section 705 as illustrated in FIG. 10 of the hand-held device 70 for the user 706 if he or she wants to know the relevant information now (step S167).

A data amount to be involved in the relevant information may be as small as possible, for example, the name of artist or the title of a song only, for the shortest communications, for users who may not be interested in the retrieved information or may not require further information or for whom the retrieved information may be a wrong one. The memory 704 and the signal processor 703 of the hand-held device 70 will thus not take a heavy burden.

The process ends if the user 706 does to want relevant information any more (NO in step S168).

The minimum relevant information may include a URL (http://www.xxx-xxxx.co.jp, for example) that indicates a Web page for more relevant information on the music for the user 706 who wants further information (YES in step S168).

Such a further information can be displayed (step S170) on a Web display section 708 such as a browser and a communications interface 707 via which the user 706 has access to a Web page 802 indicated by the URL over the Internet 801 (step S169). Moreover, when selecting the URL, the user 706 can have access to the Web page via a link section such as a hyper link without a typing operation.

Disclosed next is relevant information retrieval and goods purchasing.

The URL can be copied to another hand-held device set at home such as a personal computer for accessing a Web page indicated by the URL.

The information URL is a general pointer with a small amount of data for accessing many Web pages over the Internet. A variety of information such as artist profiles, videos, sounds and other information on CDs, concerts and several events can be displayed on Web pages with dedicated languages such as HTML and JAVA.

Data processing and transfer can also be performed via Web pages for participating in a prize competition, getting tickets for concerts, purchasing artist-related goods such as CDs and downloading digital data and payment.

Users can access several Web pages, over the Internet, that have further relevant information, with making reference to the URL information on another page written on the present page. Such Web pages offer enhanced advertisements and more chances for users to make purchase.

As disclosed, users can choose the minimum or more detailed relevant information.

Disclosed next is timing control for playing music and transfer of relevant information.

It could happen that relevant information cannot be provided to users simultaneously with the start of music played via audio output section 609 or a long pose is given between songs played successively when it takes time for retrieving the relevant information from the information providing server 50 if no relevant information is stored in the database 604 of the information providing apparatus 60.

Retrieval of relevant information takes long when the line is busy in the network 80, a heavy load is applied to the information providing server 50, and so on.

Moreover, relevant information could be switched when a song is almost over and the next song starts at the time of transmitting a relevant-information request signal from the hand-held device 70 while a user is listening to songs via the audio output section 609.

Some delay in transmission of relevant information (asynchronous with music play) is however acceptable or may be set because it seems to be very rare to transmit a relevant-information request signal from the hand-held device 70 to the information providing apparatus 60 when music is just started.

Moreover, as illustrated in FIG. 8, choice may be given to users when a song is switched to another for relevant information between a song that is played now and another song that was played just before when several songs are played successively via the audio output section 609. Relevant information as illustrated in FIG. 10 can be displayed when the choice is made.

Delay in transmission of relevant information discussed above can be avoided by retrieving a code peculiar to a storage medium 601 on which a song to be played next has been stored and retrieving relevant information on the next song from the information providing server 50 while a previous song has been played. Such delay can also be avoided by retrieving, beforehand, codes peculiar to all songs stored on a storage medium 601 such as a CD from the information providing server 50 and storing the information in the database 604 of the information providing apparatus 60.

Moreover, the relevant information can be stored in the database 604 of the information providing apparatus 60 for providing the relevant information therefrom over a predetermined period while it is retrieved from the information providing server 50 except the predetermined period when the relevant information is rarely updated for example once a day while the same music is repeatedly played in the space 40.

This information retrieval avoids application of a heavy load to the information providing server 50 or delay in retrieving relevant information.

The video output section 610 such as a monitor set in the space 40 can display relevant information on music that is played now via the audio output section 609. Thus, users do not need to have communications with the information providing apparatus 60 via their hand-held device 70 which they sometimes have to pick up from a bag or pocket.

Displaying relevant information on music that is played now on video output section 610 such as a monitor further avoids retrieval of unnecessary information which may otherwise be retrieved with other information needed to users. Users can retrieve relevant information displayed on monitor from the information providing apparatus 60 via the hand-held device 70 with no typing operation.

The relevant information described above is explained further.

The relevant information includes many kinds of information related to music, movies and so on. It may include the title of a song, the name of artist, lyrics, an artist profile, information on the artist's other songs or CDs, information on concerts or events, information on goods and presents related to the artist, voice data, and other information which can be digitized such as voice data, file data and a control signal.

A part of the information can be retrieved from the database 502 of the information providing server 50 by transmitting an identification signal with a signal indicating the type of necessary information from the information providing apparatus 60.

It is preferable that the information providing server 50 is equipped with the database 502 for management and updating of relevant information on particularly music. Because music-relevant information such as concerts and events are mostly not necessary once they are held while lyrics and the name of artist, for example, are unchangeable anytime.

If the information providing apparatus 60 set in the space 40 such as a shop is equipped with the database 502, it could be a heavy burden for the apparatus 60 to manage and update relevant information which could be a huge data.

Therefore, it is preferable for the information providing apparatus 60 to communicate with the information providing server 50 over the network 80 for accessing the relevant information managed by the server 50.

The information providing server 50 may be set in the space 40 such as a shop and close to the information providing apparatus 60 if relevant information can be managed in the space 40.

Moreover, the information providing apparatus 60 equipped with the database 604 whose storage capacity is smaller than the database 502 of the information providing server 50 can ask the server 50 whether relevant information has been updated and if so retrieve the updated information. Thus, loads for the apparatus 60 and the network 80, etc., will be lightened.

The second embodiment employs codes obtained from the storage medium 601 or music information stored on the medium 601 as the peculiar code described above. However, such a peculiar code may be a code peculiar to the information providing apparatus 60 or the hand-held device 70. Or a peculiar code may not be used if relevant information can be opened.

As disclosed above, the information retrieval system according to the present invention, users can retrieve relevant information on music or movies while they are listening to or watching in a limited space such as a CD shop, a movie theater, a restaurant or a ski resort, to their hand-held devices from a server set in the space.

The users can look at the retrieved information there and also access Web pages indicated by URL included in the relevant information over the Internet while they are in the space or move to another place for accessing further detailed information or purchasing related goods.

Moreover, audio/visual information providers can expect increase in the number of times of accessing Web pages, thus can promoting sales through on-line shopping system.

Not only the providers, shops in which such audio/visual information are provided to users or customers can expect increase in the number of customers visiting the shops because users have to visit there for obtaining relevant information.

What is claimed is:

1. An information retrieval system comprising:

a server to transmit audio and/or visual information that changes as time elapses in a limited space, and transmit relevant information in synchronism with the transmitted audio and/or visual information that changes as time elapses, the relevant information being related to and changing as time elapses in synchronism with the transmitted audio and/or visual information that changes as time elapses; and a hand-held device capable of communication with the server in a communications area covered by the server, the hand-held device establishing communication with the server via specific communication means when the hand-held device is located in the communications area, and receiving the transmitted relevant information while the communication between the hand-held device and the server is being established;

wherein the hand-held device is capable of having access to an information source different from the server, in order to gain a detailed information about the audio and/or visual information based on the received relevant information.

2. The information retrieval system according to claim 1, wherein the relevant information includes URL (Uniform Resource Locator) for accessing Web pages.

3. The information retrieval system according to claim 1, wherein the specific communication means is Bluetooth.

4. The information retrieval system according to claim 1, wherein the server further transmits a part of the audio and/or visual information to the hand-held device.

5. An information retrieval system comprising:

a provider to transmit audio and/or visual information that changes as time elapses in a limited space;

a server capable of two-way communication with the provider; and a hand-held device capable of communication with the provider in a communications area covered by the provider, wherein the provider transmits an identification signal to the server, the identification signal carrying a code peculiar to the audio and/or visual information that changes as time elapses, the provider receives relevant information sent from the server, the relevant information being related to and changing as time elapses in synchronism with the audio and/or visual information that changes as time elapses, and the provider transmits the received relevant information in synchronism with the audio and/or visual information that changes as time elapses while the audio and/or visual information is being transmitted in the limited space, on receiving the identification signal, the server retrieves, from a data base, the relevant information corresponding to the code carried by the identification signal, and transmits the retrieved relevant information to the provider, and the hand-held device establishes communication with the provider via specific communication means when the hand-held device is located in the communications area, and receives the transmitted relevant information when the communication between the hand-held device and the provider is being established;

wherein the hand-held device is capable of having access to an information source different from the server, in order to gain a detailed information about the audio and/or visual information based on the received relevant information.

6. The information retrieval system according to claim 5, wherein the relevant information includes URL (Uniform Resource Locator) for accessing Web pages.

7. The information retrieval system according to claim 5, wherein the specific communication means is Bluetooth.

* * * * *